United States Patent Office 3,234,080
Patented Feb. 8, 1966

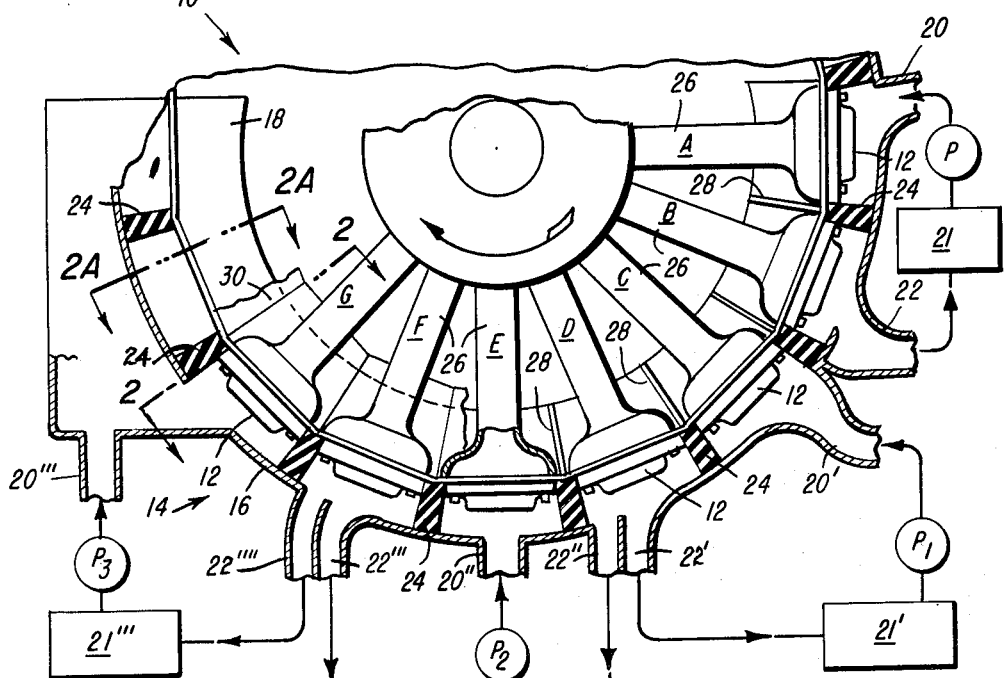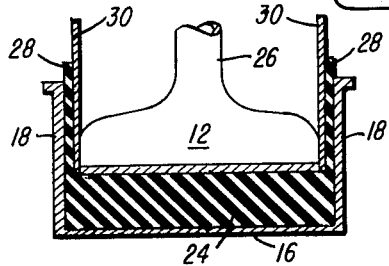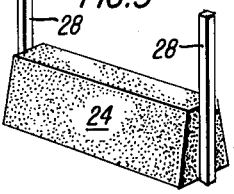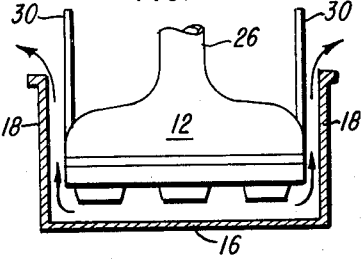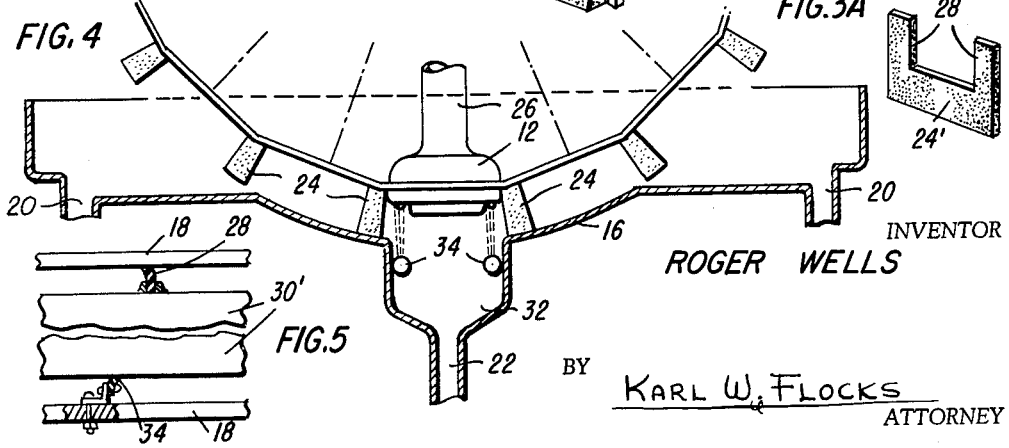

3,234,080
PULP MOLDING APPARATUS FOR FORMING
PLURAL-PLY ARTICLES
Roger Wells, Stamford, Conn., assignor to Diamond
International Corporation, a corporation of Delaware
Filed Aug. 12, 1963, Ser. No. 301,371
14 Claims. (Cl. 162—390)

The present invention relates to an apparatus for making multi-layer or laminated molded pulp articles, and more particularly to such an apparatus including pulp vat sections which move along with the molding drum.

It has long been recognized as desirable in the art of making molded pulp articles, to make articles of two or more different pulp slurries, the article comprising laminations of the two or more slurries. Such an article could have many desirable advantages such as being less expensive since the base lamination could be made of a cheaper slurry and have thereon a surface or finish lamination of a more expensive pulp. Also, in certain types of articles, it may be desirable to put on layers of different types of pulp for reasons of strength, coloring, appearance, absorptive properties, etc. It may also be desirable to apply two layers of the same type of pulp, but to utilize different stock consistencies to obtain a particular formation.

In one known prior art attempt to provide an apparatus to accomplish the fabrication of laminated articles of molded pulp, the individual layers were molded on separate screens, and then combined into a final article. This of course involved considerable transference of individual layers and also required a duplication of molding equipment and the necessity of a separate lamination apparatus.

Others in the field have attempted to provide divided tanks through which the mold, fastened to a revolving drum, was passed; a key feature of such a construction was the provision of a seal between the two compartments of the divided tank, which seal more or less attempted to closely engage the mold while permitting it to pass from one compartment to the other. These systems provided the disadvantages of permitting the leakage of pulp slurry from one compartment to the other, which leakage resulted in highly undesirable intermingling of the pulp slurries.

Another approach to the problem was to provide vats which were raised bodily to immerse the forms. Another alternative in the same type of equipment was to pump the slurry to a vat in position, in which case the vat had to be reciprocated from the mold or vice versa. Although this construction did prevent intermingling of the slurries, much expensive and complex equipment was necessary to raise or reciprocate the vats and/or the molds, particularly when the vats were filled as they were with heavy slurries and the vats could not be raised rapidly. Hence, this was not a solution of the problem of fast production without intermingling of the slurries.

It is, therefore, an object of the present invention to provide a pulp molding apparatus which is capable of forming a plurality of plys or laminations of a molded pulp article and which apparatus obviates the disadvantages of the prior art, such as indicated above.

It is another object of the present invention to provide an apparatus for high production use, suitable for forming articles of layers of molded pulp.

It is a further object of the present invention to provide an apparatus for making articles of laminations of molded pulp in which the types of molded pulp are separately maintained.

It is another object of the present invention to provide an apparatus for making articles of laminated molded pulp in which the pulp furnishes of different types are essentially prevented from intermingling even after extensive use of the apparatus.

It is another object of the present invention to provide an apparatus for forming multi-ply pulp articles, which apparatus is simple and inexpensive to construct, yet is simple and inexpensive to operate.

It is yet another object of the present invention to provide a pulp molding machine for making multi-ply pulp molded articles in which the separate pulp stocks act to successively immerse the molding screen in sealed chambers.

Other objects and the nature and advantages of the instant invention will be apparent from the following description taken in conjunction with the accompanying drawings wherein;

FIG. 1 is a sectional view, partly schematic, of an apparatus in accordance with the present invention;

FIG. 2 is a section taken along line 2—2 of FIG. 1;

FIG. 2A is a section taken along line 2A—2A of FIG. 1;

FIG. 3 is an isometric view of a detailed part of one embodiment of the present invention;

FIG. 3 is an isometric view similar to FIG. 3 of another embodiment;

FIG. 4 is a view similar to FIG. 1 showing another embodiment of the present invention;

FIG. 5 is a partly schematic broken away bottom view of another embodiment of the present invention.

Referring now to the drawings, wherein like reference characters are used to designate like or corresponding parts throughout the several views, there is shown in FIG. 1 a revolving molding drum 10 having a plurality of mold screens 12 at spaced peripheral positions thereon about the circumference of the drum 10. A curving molding vat 14 is provided in essentially complementary facing relationship to the mold screens 12 of the drum 10. The vat 14 comprises a curving bottom section 16 and side walls 18. A plurality of inlets 20 and outlets 22 are provided along the length of the vat 14. Each mold screen 12 is immersed in a plurality of pulp slurries during rotation of the drum; during such immersion the mold screens 12 have vacuum applied thereto in known fashion through hollow spokes 26 which support the mold screens 12.

Between each mold screen 12 is provided a resilient wiper blade element 24. Wiper blades 24 are attached to the drum 10 between the mold screens 12 and project radially outwardly and contact the complementary curved bottom 16 of the vat 14. Wiper blades 24 may be any thickness but are preferably, as shown in FIGS. 1 and 3, of sufficient thickness to fill the entire space between two adjacent mold screens 12. As shown in FIG. 3A however, the wiper blade element 24' may be thin. Either blade 24 or 24' performs adequately and performs the function of making a sealing contact against the curved bottom 16 of the vat 14. Thick blade 24 is preferred because it is advantageous to reduce the volume of the cavity section adjacent the mold as much as possible so that the flow of stock into and out of the cavity is kept at a minimum in order to reduce the washing effect of incoming stock or stock being dropped out of the cavity. Since the wiper blades 24 must effect a sealing moving contact with the vat bottom 16, such wiper blades are preferably formed of an elastomeric material such as natural or artificial rubber, e.g. silicone rubber; polytetrafluoroethylene and flexible polymeric materials such as polyethylene and polypropylene have also been found useful. In any event, it is necessary that the material used for the manufacture of wiper blades 24 be somewhat resilient.

From the above description of the components of the apparatus it is thus seen that a multi-ply pulp molded article is formed by rotating the drum 10, either continuously or intermittently, and providing pulp stock through a first inlet 20 wherein it contacts a mold screen 12 through which vacuum is pulled to effect a first deposit of pulp on the mold screen 12. As the drum 10 rotates, it is seen at designated step A in FIG. 1 that the pulp stock is maintained in a trapped position in the section between two adjacent wiper blades 24 until eventually the outlet 22 is reached (as shown at step B) wherein the excess pulp stock is drained away. As the drum continues to rotate, a second pulp inlet 20′ is reached (step C) wherein a second stock is permitted to enter and effect deposition of a second ply on a molded pulp article. As the drum continues to rotate to step D, the pulp is drained through outlet 22′. In this manner, as many plys are deposited as are desired and as the apparatus is set up for, e.g. 4 plys in the apparatus shown in FIG. 1. An important feature of the present invention is that the stock is fed continuously to the vat 14 and to the drum 16 at all times. The curving bottom 16 of the vat 14 usually contacts two wiper blades 24 at a time; this results in at least one seal when one of the wiper blades goes by an outlet 22 thereby permitting the stock in the section between the two wiper blades to fall out.

An essential feature of the present invention is the necessity of air relief outlets. These may be provided by forming tubes or stand pipes (not shown) extending through the adapters supporting the mold screen 24 or the outlets may be provided by forming the vat 14 wider than the drum 10. In either case air relief openings are provided to permit air to enter and escape each section as the stock fills such section or empties from it.

FIGS. 2 and 2A show the manner of providing air relief outlets by making the vat wider than the drum. In such a case in order to prevent leakage of the stock from one section to another, it is necessary to provide wiper blades extensions 28 which extend up the sides of the drum to a height higher than the level of the stock. Thus as shown in FIGS. 3 and 3A, it is necessary to provide a more or less U-shaped wiper blade which contacts not only the bottom 16 of the vat 14 but also the sides 18 thereof; this provides the necessary wiping contact against the side of the vat, as well as the bottom thereof to insure a tight seal and to prevent leakage or intermixing of the stocks. The arrows in FIG. 2A show the path of escape of air from a section as it is flooded with pulp stock.

Air relief outlets are necessary because the air that is trapped within a particular cavity section must have a means of escape. A small proportion of such air can escape through the mold screen itself; however, very little air is pulled through the wet molded gelatinous pulp product. By widening the vat and putting wiper blade extensions 28 on the side of the drum it is possible for the air that is trapped between the wiper blades to escape between the sides of the drum 10 and the sides 18 of the vat 14 as shown by the arrows in FIG. 2A. This problem of providing for escaping air only occurs as the stock rushes in to fill the empty cavity between the wiper blades.

As shown in FIGS. 1, 2 and 2A it is also desirable to put skirts 30 on the sides of the drum extending from the mold faces upward to prevent stock from flowing behind the mold faces and into the area of the spokes 26 of the drum 10.

FIG. 1 illustrates an arrangement for making a four-ply molded pulp item. However, the apparatus can be constructed to make any number of plys from two on up, limited only by the size of equipment (in normal sized equipment it would be difficult to provide more than about ten plys).

It is most desirable to feed pulp stock from a head box by means of gravity, the pulp being pumped to the head box. Such gravity feeds are most useful in the manufacture of a 2-ply article. However, when making a 3-ply article, the stock supplied for the middle ply would have to come from a stock supply tank mounted at the side of the vat or in some other area where the level of the stock would be such that the static head would guarantee a flow into the cavity section in the middle position as each successive mold moves into the proper position. As shown schematically in FIG. 1, however, it is not necessary to supply a static head of pulp stock from a head box, but instead the stock may be directly pumped by pumps P from stock reservoirs 21 through the inlets 20.

As seen in FIG. 1 there is no provision for dumping the stock from the molding section adjacent step G, fed by inlet 20′′′. Such a dumping outlet is unnecessary since if the wiping blades are tight, it is unnecessary to discharge the stock except when the machine is shut down or cleaned up. Thus in the manufacture of a 2-ply article, it is necessary to have only two inlets and one outlet, such as shown in FIG. 4.

The apparatus as described involves the making of multi-ply items of different furnishes wherein each different layer of stock completely covers the mold. However, this apparatus in conjunction with particular mold designs and vacuum arrangements makes it possible to manufacture two-ply items not only of different stocks but wherein the pick-up of these different stocks is in specific areas of the mold.

Inasmuch as there can be some leakage of the applied vacuum under the forming wire and also because there can be some deposition of pulp on the wire due to the static head of the stock even though there is no vacuum behind that particular part of the mold wherein no deposit is desired, it is desirable and possible to mount in the dump cavity 32 some deckle showers 34. These showers 34 can be positioned so that they wash parts of the mold which are not under vacuum and thus wash off any of the extraneous or loosely held pulp from areas which are to be kept bare prior to the deposition of the second stock. Such showers operate in the same manner as traditional back or deckle showers used for the washing away of flash or feathers from conventional moldings made in a single compartmented vat. In addition, such showers 34 can be utilized to spray sizing, adhesive or coloring which will end up between the plies of the product.

Another feature of the present invention is a double-dump outlet system. Such a double-dump system from most of the plys is shown in FIG. 1. This double-dump system allows for leakage past the wiper blades from the sections on both sides of the dump station. This provision is desirable in that it prevents the mixing of different stocks even though there be some leakage past the wiper blade 24. Thus, for example, if the wiper blades 24 permit some leakage, a little pulp from station C will escape through outlet 22′ while leakage from station E will escape through outlet 22′′ and 22′′′. This will, of course, prevent intermixing of the pulp stocks. It is possible if the wiper blades are made with good sealing contact all the way around, that the leakage backward will not be a problem and that the largest percentage of the dump area can be utilized for dumping successive stations as they advance. Thus outlets 22′′ and 22′′′ can be made either comparatively small to the other outlets or eliminated completely.

In certain cases (embodiment of FIG. 5), it may be desirable to eliminate the wiper blade extensions on one side of the drum and to substitute therefor a vat wiper blade 34 between each inlet 20 and outlet 22. In such a case, when the drum is stationary a complete seal is effected just as efficiently as if the wiper blades were on the side of the drum rather than on the side of the vat. This provision permits some leakage as the drum moves but at operating speeds the amount of stock which drops out from between the side of the drum and the side of the vat is negligible. An advantage of this modification is that it permits the sides of the drums to be smooth and makes it unnecessary to change the superstructure of the molding machine. Thus FIG. 5 shows an embodiment which has a wiper blade extension 28 mounted on the one side 30' of the drum 10 and on the other side a vat wiper blade 34 mounted on the vat wall 18. In certain cases it may be necessary to only provide an air outlet on one side of the drum and therefore the normal drum and vat contact may be provided at one side and a vat wiper blade 34 or a drum wiper blade extension 28 may be provided at the other side.

While the invention has been described and shown as a vertical drum revolving on a horizontal axis, it will be understood by those skilled in the art that the invention also contemplates a drum placed horizontally and revolving about a vertical axis.

It will be obvious to those skilled in the art that various changes may be made without departing from the scope of the invention and therefore the invention is not limited to what is shown in the drawings and described in the specification but only as indicated in the appended claims.

What is claimed is:

1. In a pulp molding apparatus for the manufacture of plural-ply articles comprising a pulp molding drum, means for rotating said drum, a plurality of pulp molds on the periphery of said drum, a pulp vat in facing relationship with said drum through which said molds pass, and means to apply vacuum through said molds, the improvements comprising said vat having a curving bottom section essentially complementary to said drum, at least two pulp inlets and at least one outlet to said vat, means to continuously provide different pulp slurries through said inlets into said vat for contact with an adjacent mold and subsequent flow through an outlet, a plurality of resilient wiper blade means radially mounted on said drum between said molds and projecting outwardly to contact said curving bottom of said vat to thereby seal sections of said vat adjacent each mold from each adjacent section, and air relief outlets adjacent each mold to permit air to escape from each section as pulp is provided into each said section.

2. An apparatus in accordance with claim 1 wherein said means to rotate said drum is a continuously rotating means.

3. An apparatus in accordance with claim 1 wherein said wiper blade means are sufficiently thick to fill the space between adjacent molds.

4. An apparatus in accordance with claim 1 wherein said wiper blade means are formed of elastomeric material.

5. An apparatus in accordance with claim 1 wherein said air relief outlets are provided between said vat and said drum, said vat being wider than said drum and said wiper blades having side extensions to contact the sides of said vat, said side extensions being sufficiently high to prevent pulp from passing into an adjacent section.

6. An apparatus in accordance with claim 5 further comprising drum skirts extending up the sides of said drum to a height greater than the depth of said vat to prevent pulp from flowing into said drum behind said molds.

7. An apparatus in accordance with claim 1 wherein a three-ply article is produced and at least three inlets and at least two outlets to said vat are provided.

8. An apparatus in accordance with claim 1 wherein a four-ply article is produced and at least four inlets and at least three outlets to said vat are provided.

9. An apparatus in accordance with claim 1 further comprising deckle showers to spray said molds, said showers being mounted in at least one of said outlets.

10. An apparatus in accordance with claim 1 wherein at least one of said pulp providing means to a said inlet is supplied with pulp by gravity flow from a head box, said head box being fed by a pump means.

11. An apparatus in accordance with claim 1 comprising a plurality of outlets, two of said outlets being immediately adjacent each other to provide a double dump system for preventing mixing of stocks leaking past said wiper blades from both of two sections adjacent said two outlets.

12. An apparatus in accordance with claim 1 wherein said air relief outlets are provided between said vat and said drum, said vat being wider than said drum and said wiper blades having an extension on one side of said vat, said wiper blade side extension being sufficiently high to prevent pulp from passing into an adjacent section, and further comprising drum skirts extending up the sides of said drum, and a vat wiper blade connected to said vat between each inlet and outlet, said vat wiper blade contacting the drum skirt on the side opposite said wiper blade side extension.

13. An apparatus in accordance with claim 1 wherein said air relief outlets are provided between said vat and said drum, said vat being wider than said drum, said vat and said drum being in contacting relation on one side, and said wiper blades each having an extension on the other side and extending axially from said drum to contact said other side of said vat.

14. An apparatus in accordance with claim 1 wherein said air relief outlets are provided between said vat and said drum, said vat being wider than said drum, said vat and said drum being in contacting relation on one side, and further comprising on the other side a vat wiper blade connected to said other side of said vat between each inlet and outlet and projecting axially to contact said other side of said drum.

No references cited.

DONALL H. SYLVESTER, *Primary Examiner.*

J. H. NEWSOME, *Assistant Examiner.*